Nov. 11, 1952     E. W. HOUGHTON     2,617,843
APPARATUS FOR POWER MEASUREMENTS AT HIGH FREQUENCIES
Filed Aug. 18, 1951     3 Sheets-Sheet 1

INVENTOR
E. W. HOUGHTON
BY
ATTORNEY

Nov. 11, 1952 E. W. HOUGHTON 2,617,843
APPARATUS FOR POWER MEASUREMENTS AT HIGH FREQUENCIES
Filed Aug. 18, 1951 3 Sheets-Sheet 2

INVENTOR
E. W. HOUGHTON
BY
ATTORNEY

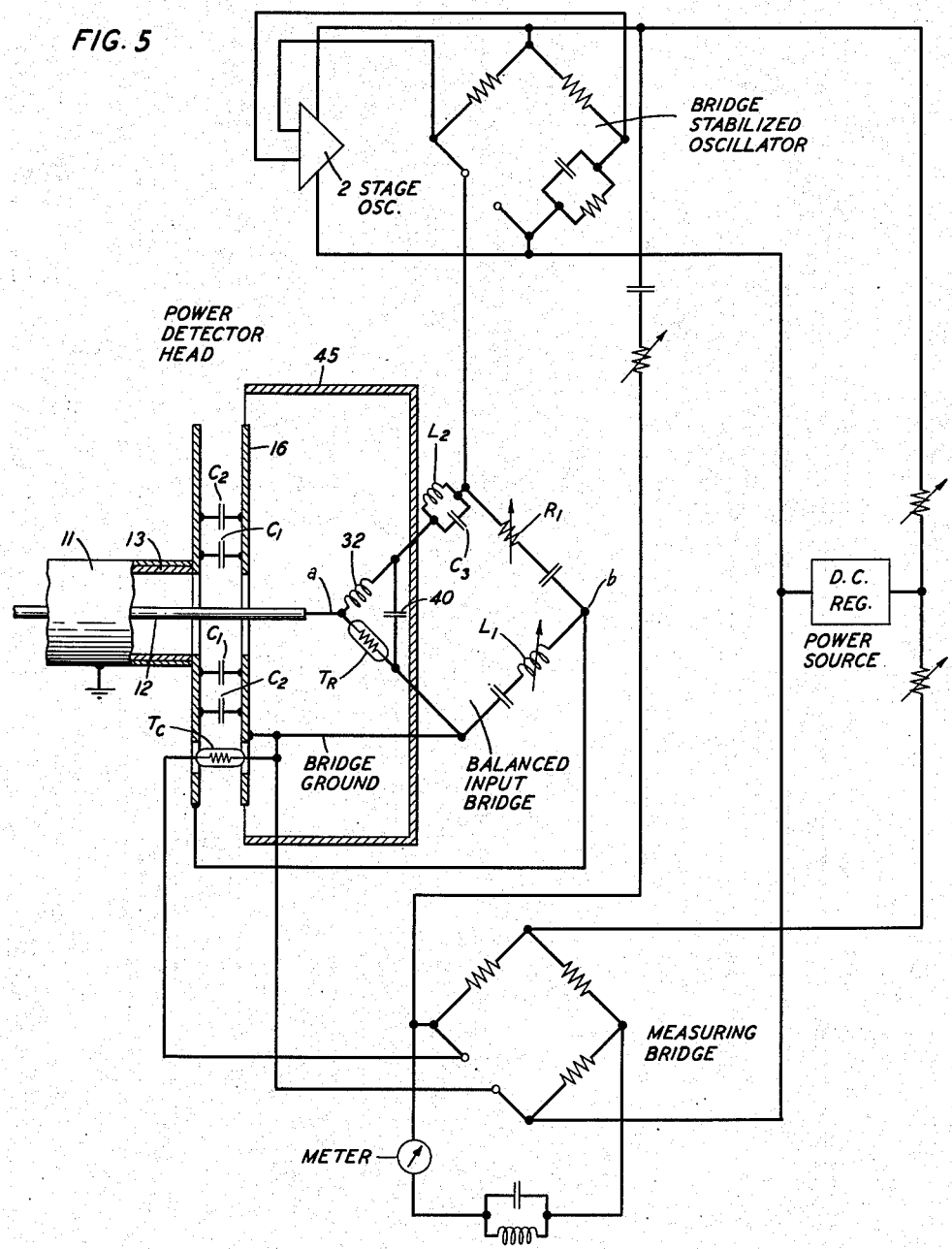

Patented Nov. 11, 1952

2,617,843

UNITED STATES PATENT OFFICE 2,617,843

APPARATUS FOR POWER MEASUREMENTS AT HIGH FREQUENCIES

Edward W. Houghton, Chatham, N. J., assignor to Bell Telephone Laboratories, Incorporated, New York, N. Y., a corporation of New York Application August 18, 1951, Serial No. 242,485

11 Claims. (Cl. 171—95)

This invention relates to apparatus for measuring high frequency power.

At frequencies above several hundred megacycles the electrical characteristics of systems are specified in terms of frequency, impedance and power. Power is used instead of current or voltage to specify operating levels because there are no really satisfactory absolute voltage or current measuring instruments and also because, even were such instruments available, a measurement of total voltage or current at any given transverse plane in the transmission system may have little meaning. At other planes, a short distance away from the accessible measuring terminal, these quantities may be vastly different because of the probable existence of standing wave phenomena along the interconnecting circuits which are almost always electrically long at these frequencies. On the other hand, a measurement of power is unambiguous since it is little changed by transmission along low-loss conductors.

Power can be measured in several essentially different ways, but at these frequencies measurements of thermal heating have been found to be advantageous. Such thermal measurements include the use of thermocouples, bolometers, calorimeters, etc. Of these the most frequently employed are thermocouples, particularly at lower frequencies, and bolometers. Bolometer instruments are used to measure power at frequencies as high as 25,000 megacycles and can give absolute measurements of power below 100 milliwatts in the micro range. Bolometer instruments include thermal resistor instruments and are so called because they operate on somewhat the same principle as the infra-red radiation instruments bearing that name.

The operation of such bolometer instruments can be stated, in simplified terms, as follows: a transmission line carrying the unknown power is terminated in a bolometer detector, the only absorbing element of which is a thermally sensitive resistor. Its direct current resistance changes when electrical power is dissipated in it, and, ideally, the change is independent of the frequency of the electric power. The change can therefore be related to high frequency power by a low frequency or direct current calibration. Advantageously, the resistance can be biased to a given value and kept constant when high frequency power is applied by removing an equal and measured quantity of direct current or low frequency power. Such a detector fundamentally responds to and thus can be used to measure the true thermal equivalent of the electrical power delivered to it.

In order to achieve true power measurement, it is necessary to meet certain conditions. This is accomplished by the provision of certain equipment in the measuring apparatus and particularly positioned on the detector head itself which connects the system being measured and the measuring apparatus. One of these conditions is that any direct current in the high frequency source must be prevented from flowing through the thermal resistor which terminates the microwave transmission line. At the same time, however, all electrical energy over a wide range of frequencies, as from 5 to 1000 megacycles, must of course be passed so that the power detector is usable over as wide a band as possible. Also while the high frequency currents must flow in the thermal resistor, it is necessary to prevent their appearance in the low frequency or direct current resistance measuring circuit, which may advantageously be a bridge, in which the thermal resistance is electrically connected and which measures the resistance of the thermal resistor.

Further, the thermal resistor, which may advantageously be of that common form of thermally sensitive resistor which has become known as the thermistor, provides the termination of the transmission line. It is therefore desirable to match the impedance of the thermistor and the line. Advantageously to measure true characteristic power, and to reduce to a minimum the variation in power indication with frequency, the input impedance of the thermistor is made as nearly as practicable equal to the characteristic impedance of the transmission line. Therefore it is desirable to maintain the resistance of the thermistor constant during the power measurements. This is achieved by connecting the thermistor in a circuit of the type disclosed in my Patent 2,449,072, issued September 14, 1948, wherein the high frequency thermistor $T_R$ is positioned in one arm of a bridge to which is connected a separate source of variable power adapted to automatically maintain the bridge in substantial balance irrespective of all conditions tending to change the temperature and resistance of the thermistor, which conditions might include either a change in ambient temperature or a change in the high frequency power being supplied to the thermistor by the transmission line. An indicating bridge is connected to this separate source of variable power to measure the variations in power from the source, and thus obtain an indication of variations of the high frequency power. This indicating bridge includes in one arm thereof a second thermistor of the same type, called the compensating thermistor, and means are provided for adjusting the power received by this thermistor so that the power indications are insensitive to ambient temperature variations.

These conditions imposed upon the power detector require a number of circuit components to be physically closely located adjacent each other. Further, it is advantageous that these components all be located in a single unit, or detector head, that is easily and removably mounted in the transmission line. Then the whole detector head can be removed and replaced if either of the thermistors is damaged or fails to operate satisfactorily. As thermistors are very small and somewhat delicate and extremely difficult to connect in equipment considerable difficulty can be encountered if provision is not made for the facile substitution of different thermistors.

It is one object of this invention to provide an improved power detector head for high frequency power measurements.

It is a further object of this invention to isolate the high frequency thermistor, which terminates the transmission line and is utilized in the power measuring circuit, from any direct current power in the signal source. More specifically it is an object of this invention to provide for the transmission of a wide band of radio frequencies to the high frequency thermistor while blocking direct current from the thermistor.

It is a further object of this invention to provide a unitary assembly including all the necessary circuit components that may be easily inserted into and removed from the transmission line whose power is being measured.

It is a still further object of this invention to improve power measurements at high frequencies.

These and other objects of this invention are achieved in one specific embodiment of this invention wherein the power detector head is a single unit comprising a short coaxial line connectable to a high frequency transmission line. The outer conductor of the coaxial line is connected to a flat circular plate adjacent which is a second flat circular plate. The second flat circular plate has a plurality of circular apertures therethrough located in a circle thereon. An apertured insulating disc is positioned between the two circular plates, the apertures in the disc being coincident with the apertures in the upper circular plate. Button condensers are located in each of the apertures and are electrically connected at their peripheries to the upper plate, as by being soldered thereto, and electrically connected at their center to the bottom plate, as by a screw extending through the center of the button condenser and secured in the lower plate. The mica and button condensers provide a double condenser, effective over a wide range of high frequencies, as explained further below.

Further, in this specific embodiment of this invention the coaxial line terminates slightly above the upper plate, the central conductor of the coaxial line being connected to a short extension of the outer conductor through a thermistor bead, which circuitwise is the high frequency thermistor $T_R$. In accordance with a feature of this invention the compensating thermistor $T_c$ is screwed into one of the flat circular plates, preferably the lower one, where it is buried so as to be at the same temperature as the high frequency thermistor $T_R$.

Additionally, in this specific embodiment of this invention, two support posts are located on the upper plate and are joined by an upper yoke member. These posts support, from the yoke member, an inductive member which is electrically secured to the central conductor of the coaxial line, and also a condenser, which together serve to prevent the appearance of the high frequency currents in the measuring circuit. The inductive member is a coil of wire encompassing a ferrite core and, as explained further below, offers a high choke impedance at all frequencies at which the power detecting head is to be used.

It is therefore one feature of this invention that the outer conductor of the coaxial line of the power detector head have therein two flat circular plates which form the terminals of two condensers, the first being defined by the mica dielectric between portions of the plates and the second by the button condensers supported in apertures in one of the plates. Further, in accordance with this feature of this invention, the two large flat circular plates provide mounting plates on which are positioned the other elements of the power detector head.

It is a further feature of this invention that the button condensers are positioned a distance away from the center of the plates such that deleterious transmission line effects are not present at high frequencies. Specifically, it is a feature of this invention that the distance from the aperture in the circular plates through which the inner conductor of the coaxial line passes to the button condensers be less than, or equal to, three-eighths a wavelength at the highest frequency of operation of the power meter with which the power detector head is employed.

In accordance with another feature of this invention, two thermistors are employed in the indicating circuits, the one thermistor being a constant impedance termination of the coaxial line and the other thermistor being mounted within the two circular plates so as to be at the same ambient temperature as the first thermistor.

In accordance with still another feature of this invention, high frequency currents are prevented from ingress into the indicating circuits by an inductance and capacitance mounted from the circular plates. Specifically, the inductance is a coil of wire encompassing a ferrite core and is positioned directly above the termination of the coaxial line.

A complete understanding of this invention and of these and other various desirable features may be gained from the following detailed description and the accompanying drawing, in which:

Fig. 5 is a circuit schematic of one indicating circuit with which a power detector head in accordance with this invention may be employed.

Figure 1:
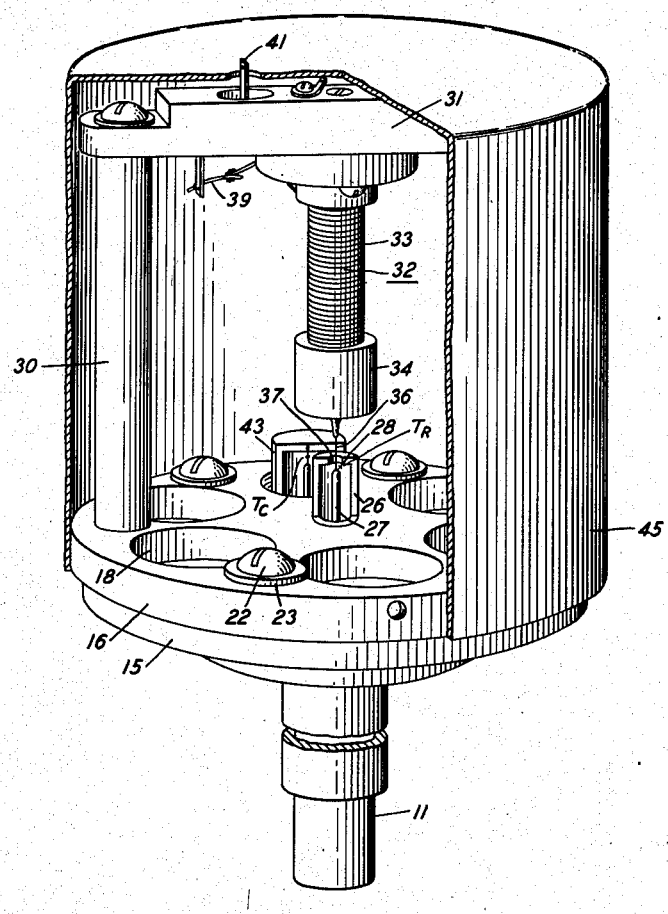
Fig. 1 is a perspective view of a demountable power detector head constructed in accordance with this invention, a portion of the cover member being broken away.
Figure 4:
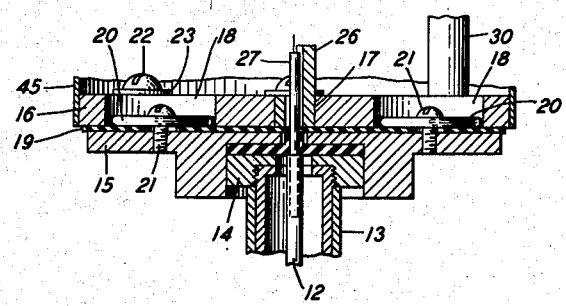
Fig. 4 is a sectional view taken along the line 4—4 of Fig. 3.
Figure 2:
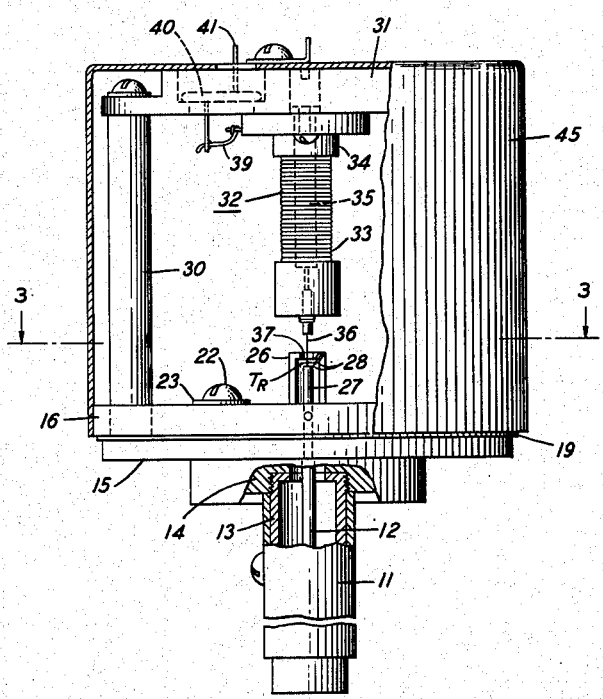
Fig. 2 is a side view of the power detector head of Fig. 1, a portion of the cover member being broken away.

Referring now to the drawings, the specific illustrative power detector head therein illustrated comprises a jack 11 adapted for facile insertion into a coaxial transmission line, the jack 11 itself being a coaxial stub having an inner conductor 12 and an outer conductor 13. A mounting disc 14 is secured to the outer conductor 13. A first or lower flat circular plate 15 is positioned on the mounting disc 14 and a second or upper flat circular plate 16 is directly adjacent to it. Each of the circular plates has a central aperture 17 therein through which the inner conductor 12 extends. The second or upper plate has a plurality of circular apertures 18 symmetrically spaced therein at a distance from the central aperture. An insulating disc 19, as of mica, is positioned between the two plates and has apertures therein coincident with the apertures of the upper plate. This dielectric disc 19 defines a capacitance $C_1$ between the two plates 15 and 16, as described more fully below.

In each of the apertures 18 there is positioned a button condenser 20 which is secured, as by soldering, to the upper plate 16. A screw 21 extends through the center of each button condenser 20 and extends into the lower plate 15. The button condensers 20 thus define a second capacitance $C_2$ between the two circular plates 15 and 16, as described more fully below. The two plates are secured together by screws 22 which are insulated, as by fibre washers 23 and bushings from the upper plate so as not to short circuit the capacitances.

A short half cup portion 26 is positioned on the upper plate 16 and defines the end portion of the outer conductor of the coaxial line. The end 27 of the inner conductor 12 extends into this half cup portion. A thermistor $T_R$ is connected between the end of the inner conductor 12 and the cup portion 26 as by fine wire leads 28. This thermistor may be of the bead type and be of the oxides of manganese, nickel, cobalt and copper. In one specific illustrative embodiment of this invention the thermistor comprised manganese and nickel oxides in approximately the proportion of 4 to 1 and traces of cobalt and copper oxides encased in a glass bead.

Figure 3:
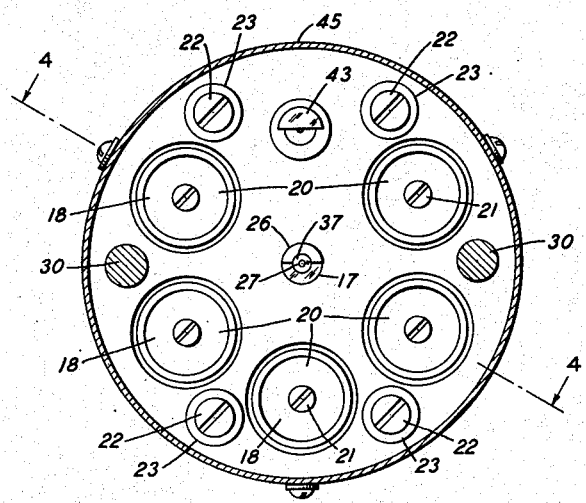
Fig. 3 is a plan view taken along the line 3—3 of Fig. 2.

Two support posts 30 extend from the upper plate 16 and have a yoke member 31 between them. A coil 32 which comprises a winding 33 on a hollow winding member 34 and a core 35 therein is supported from the yoke member directly above the cup portion 26. One end of the winding 33 is connected to the end 27 of the inner conductor 12 by a wire 36 extending through a semicircular aperture 37 in the half cup-shaped portion 26 as best seen in Fig. 3. The other end of winding 33 is connected by a lead wire 39 to a button condenser 40 positioned within the yoke member 31. As the yoke member is electrically connected to the upper plate 16 through the supporting posts 30 the button condenser 40 is electrically connected between one side of the winding 33 and the upper plate 16. A lead 41 is also connected to the center of the button condenser for further connection in the indicating and measuring circuits, as shown in Fig. 5 and described below with reference to that figure.

A second thermistor $T_C$ is mounted in a threaded plug 43 and screwed as from beneath into the upper plate 16 extending through an aperture in the lower plate 15 but not contacting the lower plate. This thermistor, which may be of the same material as the thermistor $T_R$, is thus thermally positioned within the two plates 15 and 16 and will assume the ambient temperature of the plates, which is the same temperature as that of the thermistor $T_R$. The plates and half cup portion 26 are advantageously of brass so that heat is readily conducted between the various parts of the detector head. A cover member 45 which advantageously fits over the detector head and is secured, as by screws, to the upper plate 16 also acts to confine the heat so that the thermistors $T_R$ and $T_C$ will be at the same temperature. Any energy that may be radiated is also confined within the cover member 45.

In accordance with this invention, a double acting capacitor is provided by the capacitance $C_1$ provided by the mica condenser and by the capacitance $C_2$ provided by the button condensers 20. At the higher frequencies over which the power detector head of this invention is usable the mica disc 19 provides sufficient capacitance for a low impedance path. Further the button condensers 20 are of very minor importance at these high frequencies because of inductive impedances brought about by the tending of the high frequency currents to crowd towards the inner surface of the two plates, tending to follow a path whose radius approaches that of the central aperture 17 in the plates 15 and 16. At the lower frequencies this capacitance formed by the mica disc 19 is insufficient, but the currents will then spread out radially along the plates 15 and 16 so as to flow through the button condensers 20. However, the button condensers 20, if used alone, would present considerable difficulties due to the appreciable inductance appearing at the higher frequencies and the problem of physically positioning the button condensers sufficiently close to the inner surface of the outer conductor.

This double acting capacitance, however, can have a completely different characteristic. At certain frequencies, depending on the radial distance the button condensers are from the central apertures 17, the portion of the circular plates 15 and 16 between aperture 17 and the button condensers 20 acts not as a condenser with a mica dielectric 19 but as itself a transmission line terminated in the button condensers 20. At these frequencies the button condensers will each appear as a complex circuit having a first resonance which is equivalent to a series capacitance and inductance terminating the line, and that line will have a certain characteristic impedance $Z_0$ dependent on the thickness of the sheet of dielectric, i. e., mica, 19. It is advantageous to maintain this characteristic impedance $Z_0$ of the transmission line so formed as low as possible, and therefore the sheet of mica 19 should be quite thin and, in one specific illustrative embodiment, may be of the order of 0.010 inch.

Because of the parasitic reactances associated with the button condenser, the button condenser 20 which terminates this line will go through a series of resonances and anti-resonances. Normally the impedance of the button condenser will be of the order of four or five times as great as the characteristic impedance $Z_0$, which is sufficient to make the line appear to terminate substantially in an open circuit. However, during the series resonance, the impedance may drop to a low value. One reason that I have found it advantageous to employ button condensers in the double acting capacitance in accordance with this invention, is that the parasitic impedances, both the parasitic inductance and parasitic capacitance, are such that the first resonance appears at a very high frequency. Because of this and because of the resistance losses in a condenser at high frequency, such as those due to skin effects, dielectric losses, etc., even at resonance the terminating impedance will have a finite resistance associated therewith. This resistance is a factor of the frequency and will be higher at higher frequencies. Thus by making the characteristic impedance of the line very low and assuring that the first series resonance of the button condenser occurs at a high frequency, the terminating impedance can always be higher than the characteristic impedance.

The high frequency impedance of the button condenser is transformed by the transmission line and appears at the input of the transmission as a value dependent on the length of the line and the relative values of the terminating impedance and $Z_0$. When the transmission line is short relative to the wavelength, as being of a length below a one-eighth wavelength, the transmission line will present to the incoming energy an impedance which is substantially equal to the parallel impedance of the button condenser, being lower for transmission lines approaching one-eighth wavelength. When the transmission line is from one-eighth wavelength long to between one-eighth and one-quarter wavelengths, and as the high frequency impedance of the button condenser is higher than the characteristic impedance of the line, being so provided in accordance with this invention, the transmission line presents to incoming energy an impedance which is less than the characteristic impedance of the transmission line. At a higher frequency such that the transmission line length approaches a quarter wavelength and the parallel impedance of the button condensers become high relative to the characteristic impedance of the transmission line the input impedance of the transmission line will be approximately zero if the terminating impedance is considerably larger than $Z_0$, such as ten times as large.

At a frequency such that the transmission line is a half wavelength long, as at zero wavelength, the input impedance will be the terminating impedance, thereby, in effect, negating the transmission line. Between zero wavelength and one-eighth wavelength and three-eighths wavelength and one-half wavelength the input impedance will be between $Z_0$ and the terminating impedance. Below one-eighth wavelength, however, we need not be concerned with transmission line action. At those low frequencies there is no transmission line but merely a mica condenser feeding the large button condenser, with which it is in parallel, and which is sufficient to pass the low frequency currents while blocking any direct current components, as explained above, in connection with the first action of the double acting capacitance.

At the high frequencies at which the transmission line approaches being one-half wavelength long there is also the additional problem of the possibility of a parallel resonance occurring. Were that to occur at approximately a one-half wavelength a very high impedance would appear at the input terminals. Because at these high frequencies it is difficult, if not impossible, to accurately predetermine the resonance characteristics of such circuit elements as button condensers, due to the slight variations in the condensers themselves and configuration differences due to their mounting, etc., this possibility must be considered and cannot be priorly calculated for.

I have therefore found it advantageous that the double acting capacitance, in accordance with my invention, should most advantageously be fabricated so that the distance from the central aperture 17 to the button condensers 20, which is the length of the transmission line under consideration, is less than three-eighths of the wavelength at the highest frequency at which the power detector head is expected to be used, thereby assuring that the input impedance of the transmission line is at all times between approximately zero and the characteristic impedance of the transmission line so that the capacitance defined by the insulating disc 19 is traversed by the high frequency currents, in accordance with the proper operation of the double acting capacitance of this invention. In one specific illustrative embodiment of my invention the distance was slightly under a quarter wavelength at the highest frequency.

In order to prevent the appearance of the radio frequency currents in the detector circuits the coil 32 must be an effective choke over the whole frequency range of the power detector, which in one specific application with which a specific embodiment of this invention is employable may be from 2 to 500 megacycles or higher. Over that wide a frequency range and at such high frequencies the parasitic distributed capacitance in the winding 33 itself causes series and parallel resonances. Thus the impedance of the coil 32, so far as the inductive reactance is concerned, will at a certain point or points over the range of operation drop to zero. The impedance of the thermistor $T_R$ may advantageously be approximately in the range of from 60 to 80 ohms depending on the characteristic impedance of the wave guide to which it is matched. Thus the coil would certainly not prevent the appearance of the high frequency currents in the resistance measuring circuit if its operation were dependent on the inductive reactance of the coil itself. But due to the core 35, which is of a ferrite material and around which the coil is wound, there is a resistive impedance in the coil 33 which is dependent on frequency. This impedance is due to the high loss in the material, which loss increases with frequency up to an almost steady value. It is a characteristic of almost all magnetic materials that above some frequency range the permeability of the material will decrease rapidly. With certain materials this drop is so great and so rapid that insufficient flux will be generated to cause any appreciable eddy current losses above a few megacycles while with others this effect may not occur until 20 or 30 megacycles. With ferrite, however, the permeability drops more slowly with frequency and the losses go up higher. The exact reasons for this behavior of ferrite are not known, but apparently the proper balance between a drop in permeability and increased losses is achieved so that a high impedance occurs. As the high frequency currents cannot discriminate between a high inductive impedance and a high resistive impedance, both dependent on frequency, the coil 32 is a broad band choke presenting a high impedance at all frequencies over the wide frequency range of operation of the power detector. It should be noted that while the ferrite core gives a high loss at high frequencies, where resonances of the coil may occur, it enables the attainment of a very good Q at low frequencies. Thus the coil 32 provides a low impedance direct current or low frequency connection between the high frequency thermistor $T_R$ and the measuring circuits while isolating the measuring circuit from the incoming high frequency signal.

One specific illustrative measuring circuit which I have found may be advantageously employed with a power detector head in accordance with this invention is shown in simplified form in Fig. 5. This circuit is essentially similar in its operation to that of my prior Patent 2,449,072 except for the positioning of the high frequency thermistor $T_R$ in a balanced input bridge thereby precluding the possibility of any low frequency currents from the measuring circuits flowing into the transmission line, i. e., the coaxial line 11, which supplies the incoming signal, and conversely isolates the measuring circuits from the high frequency signal. The circuit, briefly, comprises a bridge stabilized oscillator including a two-stage oscillator, a measuring bridge to which is connected an indicating device, such as a meter, and the balanced input bridge to which is fed the incoming signal. The compensating thermistor $T_c$ is included in one arm of each of the measuring bridge and the oscillator bridge.

When the oscillator, which may advantageously provide an 85-kilocycle signal, is first turned on with no incoming signal to the thermistor $T_R$ the temperature of the thermistor $T_R$ will be low, causing an unbalance. Due to this unbalance there will be an excessive amount of positive feedback so that the output voltage of the oscillator available to heat the thermistor $T_R$ will be relatively high. However, as the oscillator continues to operate during the next several moments, the oscillator bridge tends to approach balance and to decrease the amount of positive feedback which in turn results in a corresponding decrease in the magnitude of the 85-kilocycle output of the bridge oscillator. Stability is achieved then and the thermistor $T_R$ assumes a constant value which properly matches the impedance of the transmission line, as discussed above.

When high frequency signal power is applied to the high frequency thermistor $T_R$, the thermistor, as a consequence, is heated which tends to bring about a change in the effective resistance of the thermistor. However, any tendency for the temperature of the thermistor bead to go up due to this incoming power, and thereby alter the thermistor resistance, is offset by a corresponding lowering of the thermistor's temperature occasioned by a proportional decrease in the output of the 85-kilocycle bridge oscillator.

Indications of power are read on the meter M which is connected across the measuring bridge. When the 85-kilocycle oscillator output is applied to both thermistors in the absence of a high frequency signal input to the detector head, the two thermistors will remain at the same temperature despite changes in their respective resistances due to wide variations in the ambient temperature. When, however, a high frequency signal is applied to the radio frequency thermistor $T_R$, the change in effective resistance of that thermistor will be such as to decrease the output of the oscillator in order to reestablish the balanced condition. This means that less oscillator output will be applied to the compensating thermistor $T_c$ as well. Thus the amount of temperature increase that is compensated for in the high frequency thermistor $T_R$ is equal to the actual temperature decrease in the compensating thermistor $T_c$. As a consequence the effective resistance of the compensating thermistor $T_c$ increases in proportion to the amount of heating introduced into the radio frequency thermistor $T_R$ due to the heating effect of the radio frequency signal applied thereto. This change in resistance is measured by the measuring bridge and the meter and gives the indication of power in the transmission line.

In Fig. 5, the capacitance $C_1$, which is formed by the dielectric disc 19 between the plates 15 and 16, and the capacitance $C_2$, which is formed by the button condenser 20 positioned between the discs 15 and 16, are shown as being in parallel. It is to be understood, however, that they actually define a single wide band capacitance having a double action over the wide range of frequencies, as explained above, in accordance with this invention. This double acting capacitance is, in the circuit, in parallel with the stray capacitance between the bridge return circuit or bridge ground, indicated as such in Fig. 5, and the external ground, and this double acting capacitance is included in the balanced input bridge. This bridge is tuned to give an 85-kilocycle balance between the points $a$ and $b$, which, therefore, precludes the appearance of any 85-kilocycle voltage at the high frequency input terminals, i. e., in the coaxial line 11. This balance is attained by tuning $R_1$ in one branch of the balanced input bridge and $L_1$ in the neighboring branch, $L_1$ being in parallel with the double acting capacitance. In this manner, both the double acting capacitance, in accordance with this invention, and stray capacitance from bridge ground to external ground are prevented from allowing 85-kilocycle voltage appearing in the input.

The network formed by the parallel capacitance $C_3$ and inductance $L_2$ and included in another arm of the balanced input bridge, substantially tunes out the 85-kilocycle reactance of the coil 32. Capacitor 40, which as described above is advantageously a button condenser physically mounted by the yoke member 31, precludes leakage of the high frequency signal energy from the thermistor $T_R$ and at the same time prevents stray energy from gaining access to the thermistor $T_R$ to effect the heating of the latter and thereby introduce error into the power measurements.

Thus although the radio frequency thermistor $T_R$ is energized by both the high frequency energy to be measured and the 85-kilocycle voltage of the indicating circuits, substantially no 85-kilocycle voltage appears in the radio frequency transmission line and substantially no high frequency voltage appears in the indicating circuits.

It is to be understood that the above-described arrangements are illustrative of the application of the principles of the invention. Numerous other arrangements may be devised by those skilled in the art without departing from the spirit and scope of the invention.

What is claimed is:

1. Apparatus for the measurement of power at high frequencies comprising a coaxial transmission line insertable into a system to be measured, said coaxial line comprising an inner conductor and an outer conductor, means including a pair of plates forming a portion of said outer conductor and defining a double capacitance therebetween, said double capacitance comprising a dielectric disc between said plates for the passage of the higher of said high frequency currents and a plurality of individual condensers situated between said plates for the passage of the lower of said high frequency currents, variable thermal means connected between said inner and outer conductors and terminating said line, and circuit means electrically connected to said thermal means for measuring variations therein.

2. Apparatus for the measurement of power at high frequencies comprising a coaxial transmission line insertable into a system to be measured, said coaxial line comprising an inner and an outer conductor, a pair of plates forming a portion of said outer conductor and each having a central aperture therein for passage therethrough of said inner conductor, an insulating member between said plates and defining a first capacitance between said plates, a plurality of button condensers symmetrically disposed between said plates and defining a second capacitance between said plates, the distance between said central apertures and each of said button condensers being less than three-eighths of the wavelength of the highest frequency to be measured, thermally sensitive means connected between said inner and outer conductors and terminating said line, and means associated with said thermally sensitive means for measuring the power in said system.

3. Apparatus for the measurement of power at high frequencies comprising a coaxial transmission line insertable into a system to be measured, said coaxial line comprising an inner and an outer conductor, a first and a second circular plate forming portions of said outer conductor, each of said circular plates having a central aperture therein for the passage therethrough of said inner conductor, a thin dielectric member between said plates and defining a first capacitance therebetween, a plurality of button condensers symmetrically located between said plates and defining a second capacitance therebetween, a thermally sensitive resistance between said inner and outer conductors and terminating said line, and circuit means electrically connected to said thermally sensitive resistance for measuring the power dissipated therein.

4. Apparatus for the measurement of power at high frequencies comprising a coaxial transmission line insertable into a system to be measured, said coaxial line comprising an inner and an outer conductor, a first plate forming a portion of said outer conductor, a second plate forming a portion of said outer conductor and adjacent said first plate, each of said plates having a central aperture therethrough and said second plate having a plurality of apertures symmetrically located therethrough, an insulating member between said plates and having a plurality of apertures coincident with said apertures of said second plate, a capacitor located in each of said symmetrically located apertures and electrically connected across said plates, said inner conductor extending through said central apertures in said plates, an end portion of said outer conductor located on said second plate, a thermally sensitive resistance connected between the end of said inner conductor and said end portion of said outer conductor, circuit means electrically connected to said thermally sensitive resistance for measuring the power dissipated therein, choke means for preventing the high frequency currents appearing in said circuit means, and means supporting said choke means from said second plate.

5. Apparatus for the measurement of power at high frequencies in accordance with claim 4 wherein said capacitors are each positioned between said plates a distance from said central apertures of less than three-eighths of the wavelength of the highest frequency to be measured.

6. Apparatus for the measurement of power at high frequencies in accordance with claim 4 wherein said circuit means includes a second thermally sensitive resistance positioned by one of said plates.

7. Apparatus for the measurement of power at high frequencies in a transmission system comprising a coaxial transmission line insertable into the system to be measured, said coaxial transmission line comprising an inner and an outer conductor, a first circular plate forming a portion of said outer conductor, a second circular plate forming a portion of said outer conductor and adjacent said first plate, each of said plates having a central aperture therein through which said inner conductor extends and said second plate having a plurality of apertures therein coincident with said plurality of apertures in said second plate, a button condenser located in each of said plurality of apertures and electrically connected across said plates, an end portion of said outer conductor located on said second plate, a first thermally sensitive resistance connected between the end of said inner conductor and said end portion of said outer conductor and terminating said line, a second thermally sensitive resistance supported by one of said plates to be at the same ambient temperature as said first resistance, and circuit means electrically connected to said thermally sensitive resistances for measuring the power absorbed by said first thermally sensitive resistance.

8. Apparatus for the measurement of power at high frequencies in accordance with claim 7 wherein said button condensers are each positioned a distance from said central apertures less than three-eighths of the wavelength of the highest frequency to be measured.

9. Apparatus for the measurement of power at high frequencies in a transmission system comprising a coaxial transmission line insertable into the system to be measured, said coaxial transmission line comprising an inner and an outer conductor, a first and a second circular plate forming portions of said outer conductor and defining a double capacitance therebetween, one of said plates having a plurality of apertures symmetrically located therein, and each of said plates having a central aperture therein through which said inner conductor extends, a mica disc positioned between said plates and comprising one portion of said double capacitance, said disc having a plurality of apertures therein coincident with said plurality of apertures in said one plate, a button condenser located in each of said plurality of apertures and electrically connected across said plates, said button condensers comprising the second portion of said double capacitance, a first thermally sensitive resistance mounted by said plates, extending between said inner and outer conductors, and terminating said line, a second thermally sensitive resistance mounted by said plates to be at the same ambient temperature as said first resistance, and circuit means electrically connected to said thermally sensitive resistance for measuring the power absorbed by said first thermally sensitive resistance, said circuit means comprising a balanced input bridge including said first resistance in one arm thereof and said double capacitance in another arm thereof, a bridge stabilized oscillator including said balanced input bridge and said second resistance in one arm thereof, a measuring bridge including said second resistance in one arm thereof, and a meter associated with said measuring bridge.

10. Apparatus for the measurement of power at high frequencies in accordance with claim 9 wherein said button condensers are each positioned a distance from said central apertures less than three-eighths of the wavelength of the highest frequency to be measured.

11. Apparatus for the measurement of power at high frequencies in accordance with claim 10 wherein said balanced input bridge includes choke means in another arm thereof for preventing the high frequency currents appearing in said circuit means, said choke means comprising a winding and a ferrite core within said winding whereby a high impedance is presented to high frequency currents over a wide band of frequencies, a pair of posts positioned on one of said plates, and a yoke member extending between said posts, said winding being supported by said yoke member directly above the end of said inner conductor.

EDWARD W. HOUGHTON.

REFERENCES CITED

The following references are of record in the file of this patent:

UNITED STATES PATENTS

| Number | Name | Date |
| --- | --- | --- |
| 2,434,610 | Feiker | Jan. 13, 1948 |
| 2,495,752 | Montgomery | Jan. 31, 1950 |